(12) United States Patent
Minami et al.

(10) Patent No.: US 10,274,904 B2
(45) Date of Patent: Apr. 30, 2019

(54) ELECTRONIC DEVICE CAPABLE OF APPROPRIATELY USING VARIOUS TIME DISPLAYS

(71) Applicant: CASIO COMPUTER CO., LTD., Shibuya-ku, Tokyo (JP)

(72) Inventors: Tsuyoshi Minami, Musashimurayama (JP); Kimiyasu Mizuno, Akishima (JP); Hideo Suzuki, Ome (JP); Takashi Suenaga, Setagaya (JP); Keiichi Nomura, Uenohara (JP); Shuhei Uchida, Hamura (JP); Munetaka Seo, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 170 days.

(21) Appl. No.: 15/373,423

(22) Filed: Dec. 8, 2016

(65) Prior Publication Data

US 2017/0277136 A1    Sep. 28, 2017

(30) Foreign Application Priority Data

Mar. 23, 2016   (JP) ................. 2016-058331

(51) Int. Cl.
*G06F 1/16*    (2006.01)
*G06F 1/32*    (2006.01)
(Continued)

(52) U.S. Cl.
CPC ............ *G04G 19/06* (2013.01); *G06F 1/163* (2013.01); *G06F 1/3265* (2013.01); *G06F 1/3287* (2013.01); *G06F 1/3296* (2013.01); *G06F 3/147* (2013.01); *G06F 3/1423* (2013.01); *G06F 3/1438* (2013.01); *G09G 2330/021* (2013.01); *G09G 2330/022* (2013.01);
(Continued)

(58) Field of Classification Search
CPC .......... G04C 13/03; G04G 19/12; G04G 7/00; G04G 21/00; G04G 21/02; G04G 21/08
See application file for complete search history.

(56) References Cited

U.S. PATENT DOCUMENTS 4,247,930 A * 1/1981 Martin ................ G04G 9/0082
                                                    349/58
4,355,380 A * 10/1982 Huguenin ................ G04C 3/14
                                                    368/71
(Continued)

FOREIGN PATENT DOCUMENTS

JP    2006101505 A    4/2006
JP    2010277285 A    12/2010
(Continued)

OTHER PUBLICATIONS

Japanese Office Action (and English language translation thereof) dated Feb. 19, 2019 issued in Japanese Application No. 2018-072658.

*Primary Examiner* — Daniel P Wicklund
(74) *Attorney, Agent, or Firm* — Holtz, Holtz & Volek PC

(57) ABSTRACT

A smart watch includes a main CPU, a sub CPU, a first display unit, and a second display unit. While the main CPU and the sub CPU cooperate with each other and perform a display operation including a time display, time display processing is performed to at least either of the first display unit or the second display unit according to an operation state.

14 Claims, 10 Drawing Sheets

(51) Int. Cl.
*G06F 3/14* (2006.01)
*G04G 19/06* (2006.01)
*G06F 3/147* (2006.01)
*G06F 1/3234* (2019.01)
*G06F 1/3296* (2019.01)
*G06F 1/3287* (2019.01)

(52) U.S. Cl.
CPC ..... *G09G 2340/14* (2013.01); *G09G 2360/06* (2013.01); *Y02D 10/153* (2018.01); *Y02D 10/171* (2018.01); *Y02D 10/172* (2018.01); *Y02D 50/20* (2018.01)

(56) References Cited

U.S. PATENT DOCUMENTS

| | | | | |
|---|---|---|---|---|
| 6,600,527 | B1* | 7/2003 | Basturk | G02F 1/133536 349/115 |
| 7,205,959 | B2* | 4/2007 | Henriksson | G09F 9/00 345/169 |
| 7,593,755 | B2 | 9/2009 | Colando et al. | |
| 2002/0071347 | A1* | 6/2002 | Gilomen | G04G 9/00 368/82 |
| 2010/0007576 | A1* | 1/2010 | Demuynck | H04M 1/0214 345/1.3 |
| 2012/0060089 | A1* | 3/2012 | Heo | G06F 1/1647 715/702 |
| 2012/0309465 | A1* | 12/2012 | Tani | G06F 1/1624 455/566 |
| 2013/0038615 | A1* | 2/2013 | Hendry | G06F 1/3206 345/502 |
| 2015/0301506 | A1* | 10/2015 | Koumaiha | G04G 21/08 368/10 |
| 2016/0231974 | A1* | 8/2016 | Lee | G06F 3/1431 |
| 2017/0075316 | A1* | 3/2017 | Berdinis | G04G 19/06 |
| 2017/0082978 | A1* | 3/2017 | Schneider | G04B 19/04 |
| 2017/0177067 | A1* | 6/2017 | Okada | G06F 1/3287 |

FOREIGN PATENT DOCUMENTS

| | | |
|---|---|---|
| JP | 2011038999 A | 2/2011 |
| JP | 2012147229 A | 8/2012 |
| JP | 2012205677 A | 10/2012 |

* cited by examiner

ELECTRONIC DEVICE CAPABLE OF APPROPRIATELY USING VARIOUS TIME DISPLAYS

CROSS-REFERENCE TO RELATED APPLICATIONS

The present invention claims a priority that Japanese Patent Application No. 2016-058331 applied on Mar. 23, 2016 is a basic application, and entire contents in the basic application are included in the present invention.

FIELD OF THE INVENTION

The present invention relates to an electronic device capable of appropriately using various time displays.

BACKGROUND OF THE INVENTION

Conventionally, an electronic device (electronic display apparatus) includes a display unit and can display each kind of information. The electronic display device can cause the display unit to display variously in response to improvement on a display screen. In addition, conventionally, the electronic display device includes a plurality of display units and has a technique to appropriately use a plurality of display units according to a display content (for example, refer to JP 2006-101505 A).

SUMMARY OF THE INVENTION

According to a first aspect of the present invention, there is provided an electronic device, including: a first processor; a second processor; a first display unit; and a second display unit, wherein while the first processor and the second processor cooperate with each other and perform a display operation including a time display, time display processing is performed to at least either of the first display unit or the second display unit according to an operation state.

DETAILED DESCRIPTION OF THE PREFERRED EMBODIMENTS

Hereinafter, embodiments in the case where an electronic device in the present invention is realized as a smart watch will be described with reference to drawings.

Figure 1A:
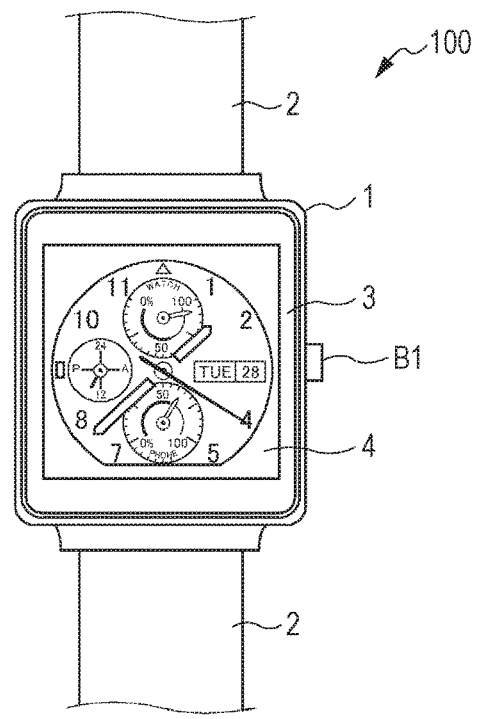
FIG. 1A is an elevation view of a smart watch according to an embodiment of an electronic device in the present invention.
Figure 1B:
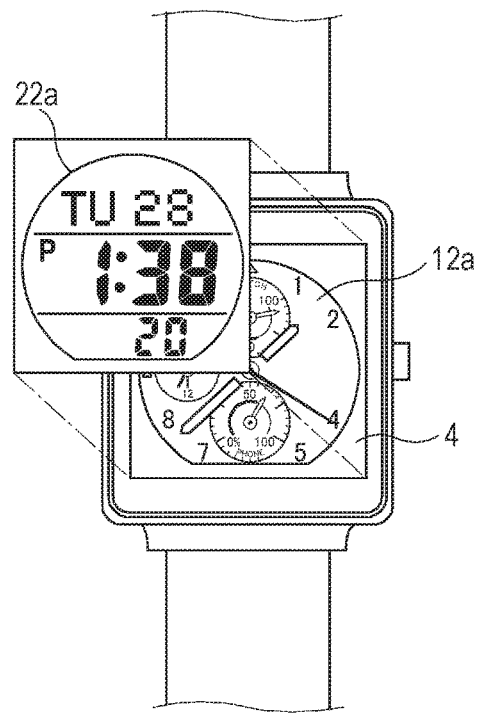
FIG. 1B is an elevation view of a smart watch according to the embodiment of the electronic device in the present invention.

FIGS. 1A and 1B are elevation views of a smart watch 100 according to the embodiment of the electronic device in the present invention.

As illustrated in FIG. 1A, the smart watch 100 is a wrist mounting type electronic device in which a watch body 1 is mounted around user's wrist by using a band 2. The watch body 1 of the smart watch 100 includes a frame 3, a display screen 4, and a push button switch B1.

The push button switch B1 is provided on a side surface of the frame 3 and receives a pushing operation by a user. When the push button switch B1 is pressed, a power mode is returned from a low power mode or a pause mode to a normal mode to be described later.

A display unit having two screens is stacked on the display screen 4. As illustrated in FIG. 1B, a display screen 12a of a first display unit 12 (refer to FIG. 2) is provided in a lower portion, and a display screen 22a of a second display unit 22 (refer to FIG. 2) is provided in an upper portion. Specifically, FIG. 1A illustrates a state in which the first display unit 12 performs display, and the display screen 22a of the second display unit 22 transmits the display by the first display unit 12.

In a further upper portion of the second display unit 22, a touch sensor (not illustrated) is provided and receives a user operation together with the push button switch B1.

The first display unit 12 includes a dot matrix type color liquid crystal display screen and switches and/or parallelly performs various displays regarding each function according to an input operation by a user and each program operation.

The second display unit 22 includes a display screen capable of displaying a time by a simple display with low power consumption in comparison with the first display unit 12 and, for example, performs segment type monochrome liquid crystal display. Alternatively, Memory-In-Pixel (MIP) liquid crystal, Polymer Network (PN) liquid crystal, or the like may be used for the display screen 22a of the second display unit 22. Further, the display screen 22a of the second display unit 22 can transmit a display content of the first display unit 12 upward. In this case, the second display unit does not display at all since a predetermined voltage is applied.

Figure 2:
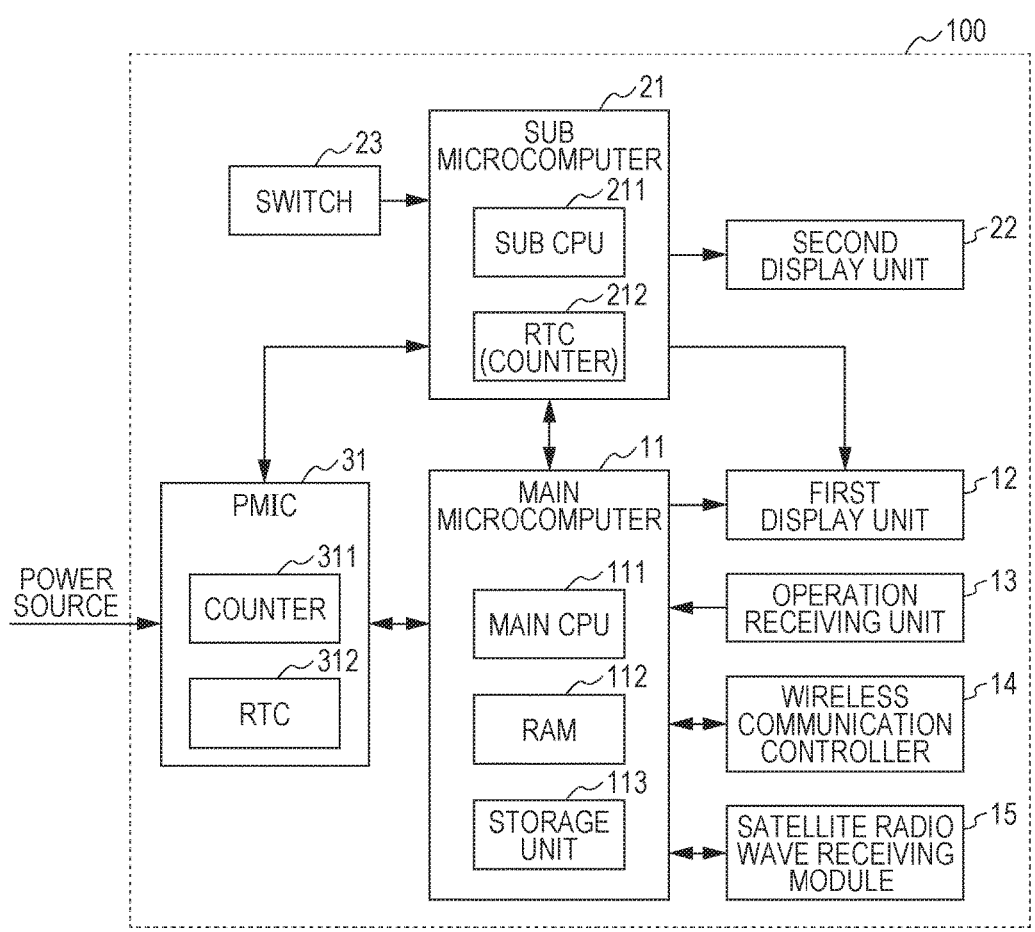
FIG. 2 is a block diagram illustrating a functional configuration of the smart watch.

FIG. 2 is a block diagram illustrating a functional configuration of the smart watch 100 according to the embodiment.

The smart watch 100 includes a main microcomputer 11, the first display unit 12 (first display unit), an operation receiving unit 13, a wireless communication controller 14, a satellite radio wave receiving module 15, a sub microcomputer 21, a second display unit 22 (second display unit), a switch 23, a PMIC 31 (Power Management IC), and the like.

The main microcomputer 11 is a main control unit including a main CPU 111 (first processor), a RAM 112, a storage unit 113, and the like. The main microcomputer 11 controls each operation of the first display unit 12, the operation receiving unit 13, the wireless communication controller 14, the satellite radio wave receiving module 15, and the like by receiving power supply from a power source by control of the PMIC 31.

The main CPU 111 performs each arithmetic processing and totally controls operations in a normal operation state of the smart watch 100.

The RAM 112 provides a working memory space to the main CPU 111 and temporarily stores data. The RAM 112 stores and holds information on a time counted by the main CPU 111 as a first clock unit based on a clock signal (not illustrated). Hereinafter, "time" may mean "date and time" including a date.

The storage unit 113 is a nonvolatile memory such as a flash memory for storing a control program and a set data performed by the main CPU 111.

A display operation of the above-described first display unit 12 is controlled by mainly the main microcomputer 11 (main CPU 111 (refer to FIG. 2)). However, the sub microcomputer 21 (sub CPU 211 (refer to FIG. 2)) can perform display control.

The operation receiving unit 13 includes the above-described push button switch B1 and a touch sensor. The operation receiving unit 13 receives an input operation by a user, converts an operation content into an electrical signal, and outputs the signal to the main CPU 111.

The wireless communication controller 14 is a controller for performing wireless communication with an external electronic device. Examples of a wireless communication standard include, but not especially limited to, short-range wireless communication such as Bluetooth (a registered trademark) and a wireless LAN (IEEE802.11). The main microcomputer 11 (main CPU 111) can obtain necessary information and programs, update data thereof, and the like can be obtained from outside via the wireless communication controller 14. Examples of the external electronic device to be communicated include a smart phone, a cell phone, a tablet terminal, and a personal digital assistant (PDA). Among them, especially, when a smart phone and a cell phone are connected to a base station, time information is synchronized, and time accuracy is maintained. In the case where the main CPU 111 communicates and connects to a smart phone and a cell phone, the main CPU 111 acquires time information from these external devices and can correct a counting time based on the acquired time information.

The satellite radio wave receiving module 15 can capture, receive, and demodulate radio waves from a positioning satellite, at least a satellite related to a global positioning system (GPS) (GPS satellite) and can perform time acquisition and positioning. The satellite radio wave receiving module 15 includes an antenna (not illustrated) and performs inverse spectral diffusion by receiving radio waves from the L1 band (1.57542 GHz in a GPS satellite) based on control of the main microcomputer 11 (main CPU 111). Then, the satellite radio wave receiving module 15 obtains and decrypts a navigation message and outputs the message by a predetermined format.

The sub microcomputer 21 includes a sub CPU 211 (second processor) and an RTC 212 (real time clock and a second clock unit). The sub microcomputer 21 operates by receiving power supply from a power source by control of the PMIC 31 and mainly controls an operation of the second display unit 22.

The sub CPU 211 performs each arithmetic processing and controls operations of the sub microcomputer 21. The sub CPU 211 operates with a low power consumption and a low operation frequency in comparison with the main CPU 111. Accordingly, the sub CPU 211 may have a lower capacity than the main CPU 111. The sub CPU 211 operates, for example, at a regular timing to perform a predetermined operation and when detecting an input from the main CPU 111 and the switch 23, and the sub CPU 211 may be in a standby state other than during the above.

The RTC 212 is usually used to count a time and preferably operates with a low power consumption.

As described above, the second display unit 22 operates with a low power consumption in comparison with the first display unit 12 and also is used for a time display during a display operation. In the case where MIP liquid crystal is used for a display screen, the sub CPU 211 can reduce a frequency to update a display content. Therefore, during an update interval, the sub CPU 211 can be in the standby state.

The switch 23 is an on-switch which receives a predetermined user operation to restart the main microcomputer 11 in the case where the main microcomputer 11 is in a pause state. The switch 23 may be exclusively provided and may be used with the push button switch B1.

The PMIC 31 controls power supply to the main microcomputer 11 and the sub microcomputer 21 from a power source. The PMIC 31 includes, for example, a switch for switching power output availability to the main microcomputer 11 and the sub microcomputer 21 and a DC/DC converter for adjusting an output voltage, or the like, and power is appropriately supplied while the main microcomputer 11 and the sub microcomputer 21 are operated.

Further, the PMIC 31 includes a counter 311 (first counting unit) and an RTC 312 (third clock unit).

The counter 311 counts a predetermined clock signal and outputs the signal periodically (at predetermined time intervals) for every set count values. As the clock signal, an oscillation signal of an oscillator included in the RTC 312 or a signal obtained by frequency-dividing the oscillation signal is used.

The RTC 312 is generally used to count a time. This RTC 312 may be the same type with the RTC 212 or may be a different type.

Next, a display operation and a power control by the smart watch 100 according to the embodiment will be described.

Three power consumption modes (operation states) can be set in the smart watch 100. As this power consumption mode, with respect to a normal mode for normal operation, a low power mode and a pause mode are set. In the low power mode, a power consumption is lower than a power consumption in the normal mode. In the pause mode, a power consumption is lower than a power consumption in the low power mode.

FIGS. 3A to 3D are elevation views exemplifying a display state in the case where the smart watch 100 is in each power consumption mode.

Figure 3A:
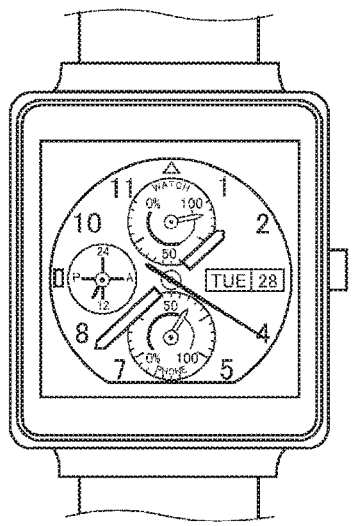
FIG. 3A is an elevation view illustrating an example of a display state in the case where the smart watch is in each power consumption mode.

The normal mode is a mode capable of executing every normal interactive functions included in the smart watch 100. In the normal mode, the main microcomputer 11 is mainly operated, and as illustrated in FIG. 3A, each type of display operation is performed to the first display unit 12 by control of the main CPU 111. A time display can be included in a content to be displayed by the first display unit 12. In this case, a hour hand, a minute hand, and a second hand are displayed in the time display, and the time display is updated per second (a first time interval) by moving the second hand. Further, in the case where specific functional operation is performed, a time cannot be temporarily displayed in the smart watch 100.

Figure 3B:
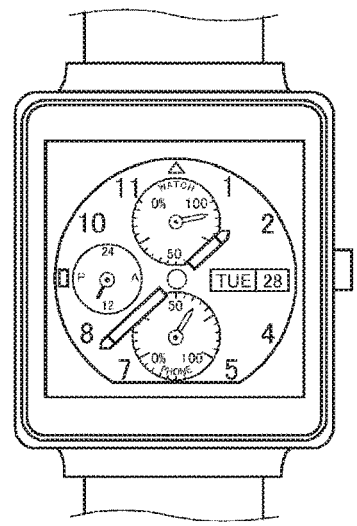
FIG. 3B is an elevation view illustrating an example of a display state in the case where the smart watch is in each power consumption mode.

The low power mode is a temporary power consumption mode in the case where a standby state is continued during an operation in the normal mode, for example. The mode is immediately returned to the normal mode in the case where an input operation to the operation receiving unit 13 by a user is detected and in the case where a display content related to a function performed in the normal mode is updated, for example. In the low power mode, as illustrated in FIG. 3B, a time display is performed to the first display unit 12 by control of the CPU 111. However, a power consumption related to the display is reduced by limiting a display color, a luminance, and an update interval in comparison with a display state in the normal mode. For example, here, by erasing a drawing of a second hand, drawing of a hour hand and a minute hand is updated at a predetermined time interval, for example, every ten seconds or one minute.

FIGS. 3A and 3B exemplify time displays, and an analog clock display in which a pointer is drawn on a display screen is indicated. However, a normal digital clock display in which a time is indicated by numerical values may be used.

Figure 3C:
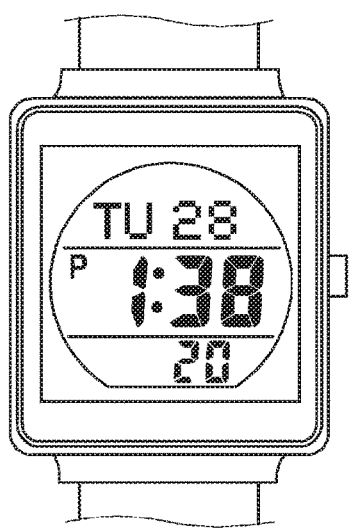
FIG. 3C is an elevation view illustrating an example of a display state in the case where the smart watch is in each power consumption mode.

In the pause mode, an operation of the main microcomputer 11 is stopped, and the sub microcomputer 21 is operated. An operation of the first display unit 12 is also stopped when an operation of the main microcomputer 11 is stopped, and the second display unit 22 display a time by control of the sub CPU 211 of the sub microcomputer 21 as illustrated in FIG. 3C. Here, a time display is updated per second. However, a power consumption related to a display by an operation of the second display unit 22 and the sub CPU 211 with a low power consumption is lower than a power consumption related to a display by operations of the first display unit 12 and the main CPU 111 in the low power mode. The mode transits to the pause mode in the case where an explicit instruction is received by a predetermined operation by a user and in the case where it becomes difficult to maintain a stable operation of the main microcomputer 11 since power supply from a power source is insufficient. In the smart watch 100, the mode is returned from the pause mode to the normal mode when the switch 23 is pressed in the pause mode.

Figure 4:
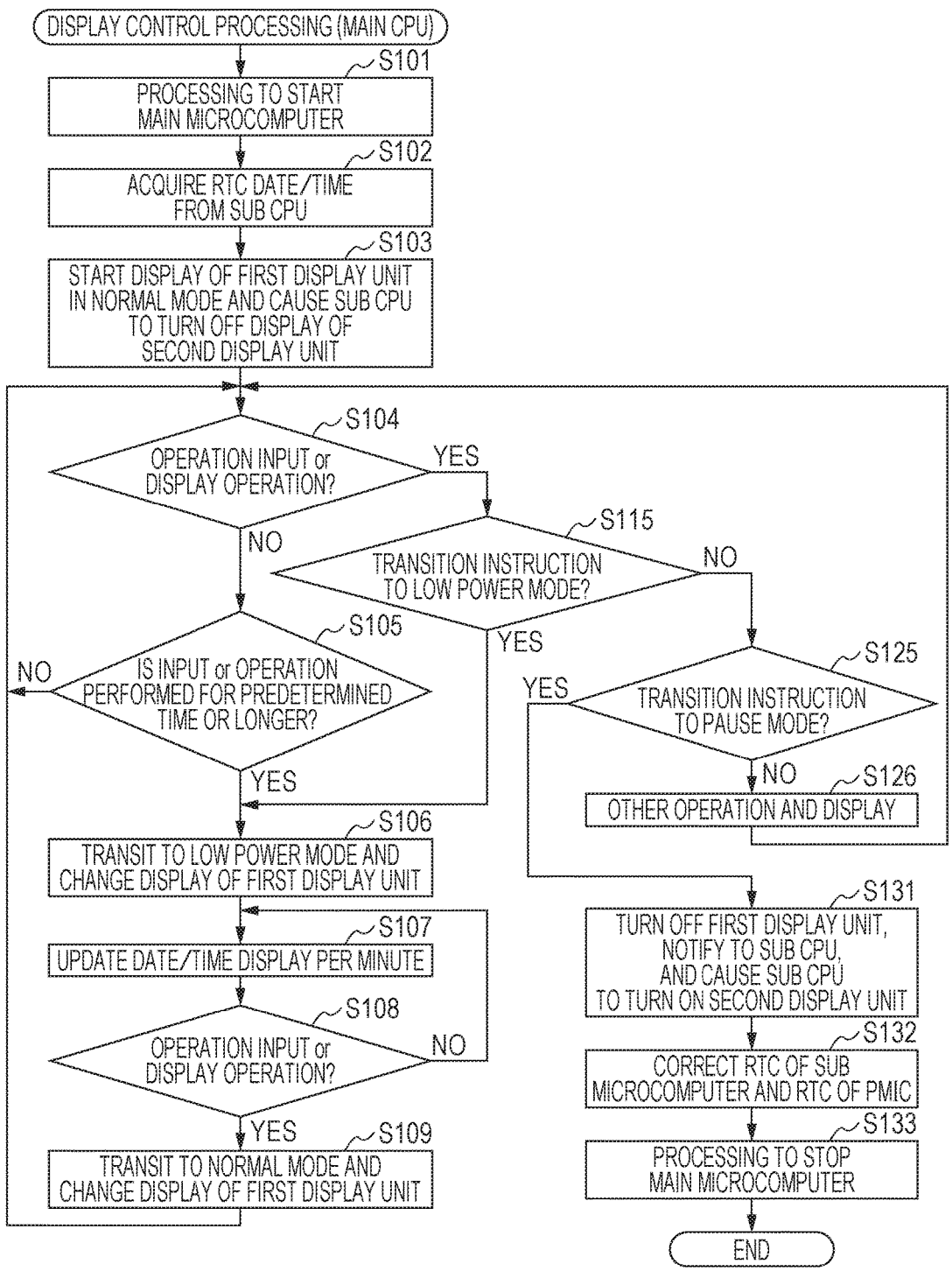
FIG. 4 is a flowchart illustrating a control procedure in display control processing performed by a main CPU.

FIG. 4 is a flowchart illustrating a control procedure in display control processing performed by the main CPU 111 in the smart watch 100 according to the embodiment.

This display control processing is started when the main CPU 111 is started and continuously performed until being turned off.

The main CPU 111 first performs processing to start the main microcomputer 11 (step S101). The main CPU 111 requests time information by sending a control signal to the sub CPU 211 and starts counting a time based on time data of the RTC 212 received from the sub CPU 211 (step S102). The main CPU 111 starts a display of the first display unit 12 in the normal mode and stops a display of the second display unit 22 by outputting a control signal to the sub CPU 211, and the second display unit 22 transmits the display by the first display unit 12 (step S103).

The main CPU 111 determines whether an input operation to the operation receiving unit 13 is detected or whether an input related to a display update operation regarding a function being operated is performed (step S104). In the case where neither is determined ("NO" in step S104), the main CPU 111 determines whether an input operation detection and a display update operation are not input for a predetermined time or longer (step S105). In the case where it is determined that both of them are input within the predetermined time ("NO" in step S105), processing of the main CPU 111 is returned to step S104. In the case where it is determined that neither is input for the predetermined time or longer ("YES" in step S105), the processing of the main CPU 111 is moved to step S106.

In the case where it has been determined in the determination processing in step S104 that the input operation is detected or a display update operation is input ("YES" in step S104), the main CPU 111 determines whether an input detection content is an instruction for transition to a low power mode (step S115). In the case where it is determined that the content is the instruction for transition to the low power mode ("YES" in step S115), processing of the main CPU 111 is shifted to step S106.

In the case where it is determined that the content is not the instruction for transition to the low power mode ("NO" in step S115), the main CPU 111 determines whether an input detection content is an instruction for transition to a pause mode (step S125). In the case where it is determined that the content is not the instruction for transition to the pause mode ("NO" in step S125), the main CPU 111 performs operation and display according to the other detected contents (step S126). Then, processing of the main CPU 111 is shifted to step S104.

When the processing is shifted from steps S105 and S115 to step S106, the main CPU 111 changes a power consumption mode to a low power mode, and a display of the first display unit 12 is changed to a display state in the low power mode (step S106). The main CPU 111 updates a time display per minute by the first display unit 12 (step S107) and also determines whether an input operation is detected or a display update operation is input (step S108). In the case where it is determined that neither is determined ("NO" in step S108), processing of the main CPU 111 is returned to step S107. In the case where either of them is determined ("YES" in step S108), the main CPU 111 changes a power consumption mode to a normal mode and changes the display of the first display unit 12 to a normal mode display state (step S109). Then, processing of the main CPU 111 is returned to step S104.

In the case where it is determined in the determination processing in step S125 that an instruction for transition to the pause mode is detected ("YES" in step S125), the main CPU 111 stops a display operation of the first display unit 12 and also causes the sub CPU 211 to start and control a display operation of the second display unit 22 by outputting a control signal to the sub CPU 211 (step S131).

The main CPU 111 outputs a control signal to the sub CPU 211 and the PMIC 31 and causes them to correct times to be counted by the RTCs 212 and 312 according to the counted time (step S132). The main CPU 111 performs processing to stop an operation of the main microcomputer 11 and stops an operation of the main microcomputer 11 including the main CPU 111 (step S133) and finishes display control processing.

Figure 5:
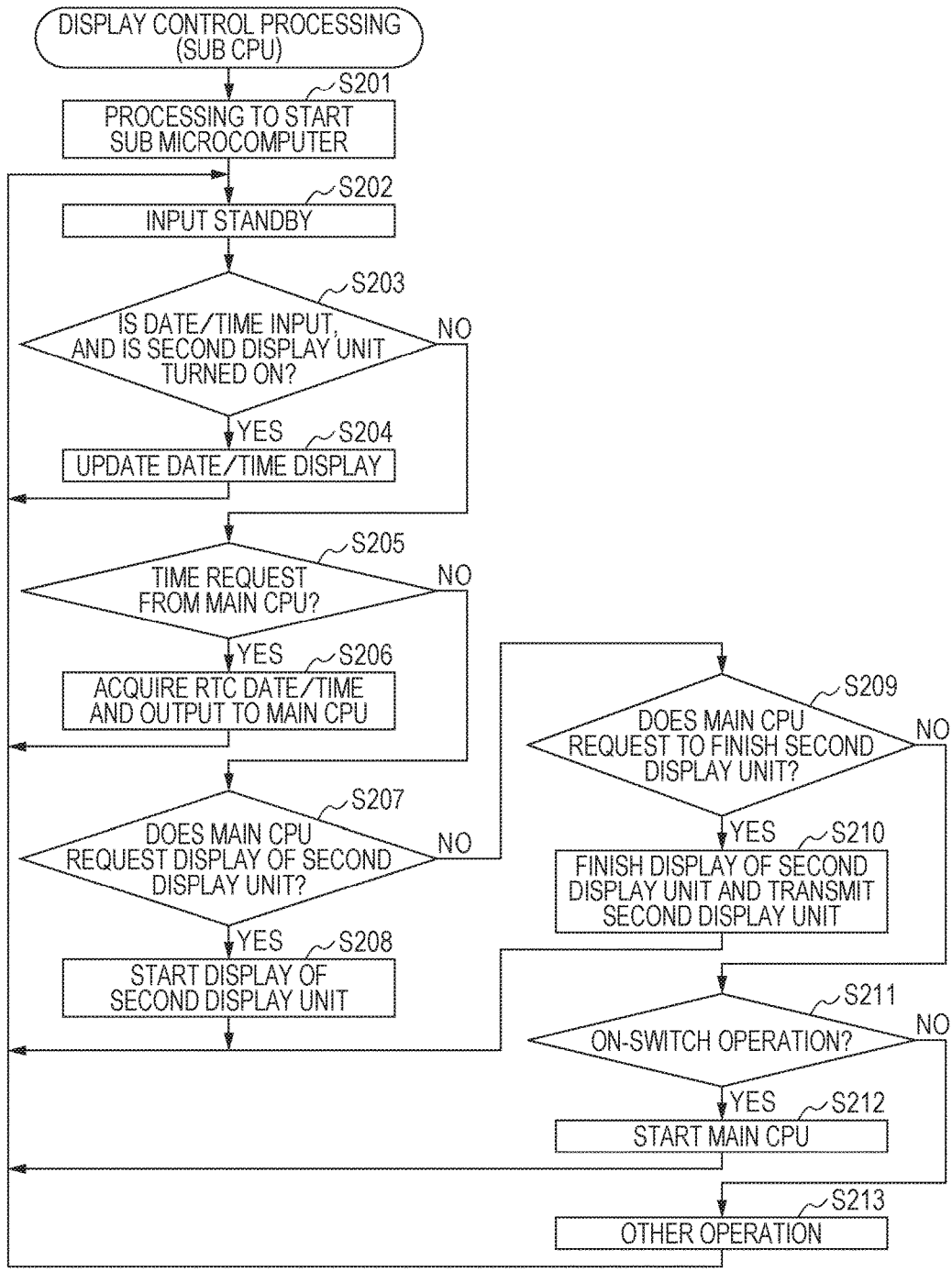
FIG. 5 is a flowchart illustrating a control procedure in display control processing performed by a sub CPU.

FIG. 5 is a flowchart illustrating a control procedure of display control processing by the sub CPU 211.

This display control processing is started when the sub CPU 211 is started and continuously performed. After starting, the sub microcomputer 21 in the smart watch 100 according to the embodiment is not turned off until a power source is removed, or a battery runs out.

The sub CPU 211 performs processing to start the sub microcomputer 21 (step S201). Then, the sub CPU 211 waits until an input regarding a control operation is detected (step S202). In this case, this waiting processing is to wait for an interruption signal, and it is not necessary to positively perform the waiting processing.

When the interruption signal is input, the sub CPU 211 determines an input content. The sub CPU 211 determines whether the interruption signal is a time input from the RTC 212 and also whether the second display unit 22 is in a display operation state (step S203). In the case where the sub CPU 211 determines that the interruption signal is a time input, and the second display unit 22 is in the display operation state ("YES" in step S203), the sub CPU 211 outputs a control signal to update a time display of the second display unit 22 to the second display unit 22 (step S204). Then, processing of the sub CPU 211 is returned to step S202.

In the case where it is determined that the input content is not a time, or the second display unit 22 is not in a display operation state ("NO" in step S203), the sub CPU 211 determines whether a request of time information from the main CPU 111 is input (Step S205). In the case where it is determined that the request of time information is input ("YES" in step S205), the sub CPU 211 obtains a time from the RTC 212 and outputs the time to the main CPU 111 (step S206). Then, processing of the sub CPU 211 is returned to step S202.

In the case where it is determined that the request of time information is not input from the main CPU 111 ("NO" in step S205), the sub CPU 211 determines whether a request to start a display operation of the second display unit 22 is input from the main CPU 111 (step S207). In the case where it is determined that the request to start the display operation of the second display unit 22 is input ("YES" in step S207), the sub CPU 211 starts a display operation of the second display unit 22 (step S208). Then, processing of the sub CPU 211 is returned to step S202.

In the case where it is determined that the request to start a display operation of the second display unit 22 is not input from the main CPU 111 ("NO" in step S207), the sub CPU 211 determines whether a request to finish the display operation of the second display unit 22 is input from the main CPU 111 (step S209). In the case where it is determined that the request to finish the display operation of the second display unit 22 is input ("YES" in step S209), the sub CPU 211 finishes the display operation of the second display unit 22 and the second display unit 22 is put in a transmitting state (step S210). Then, processing of the sub CPU 211 is returned to step S202.

In the case where it is determined that the request to finish the display operation of the second display unit 22 is not input from the main CPU 111 ("NO" in step S209), the sub CPU 211 determines whether a pushing operation of the switch 23 is detected (step S211). In the case where it is determined that the pushing operation of the switch 23 is detected ("YES" in step S211), the sub CPU 211 operates to start the main CPU 111 (step S212). Then, processing of the sub CPU 211 is returned to step S202.

In the case where it is determined that the pushing operation of the switch 23 is not detected ("NO" in step S211), the sub CPU 211 performs processing in response to the other detected input (step S213). Then, processing of the sub CPU 211 is returned to step S202.

As described above, the smart watch 100 according to the embodiment includes the main CPU 111, the sub CPU 211, the first display unit 12, and the second display unit 22. While the main CPU 111 and the sub CPU 211 cooperate with each other, and perform a display operation including a time display, time display processing is performed to at least either of the first display unit 12 or the second display unit 22 according to an operation state.

Thus, two CPUs cooperate with each other and control two display units. The CPUs can further flexibly and appropriately control various display patterns by causing either of the display units to display a time according to an operation state.

In addition, the main CPU 111 can be selectively set to any of a plurality of power consumption modes as an operation state and therefore can improve an operation efficiency by appropriately using a display unit and a CPU according to a power consumption.

Further, a plurality of the power consumption modes includes a normal mode, a low power mode, and a pause mode. A power consumption in the low power mode is lower than a power consumption in the normal mode. A power consumption in the pause mode is lower than a power consumption in the low power mode, and the main CPU 111 is stopped in the pause mode. Thus, an operation according to a power consumption can be easily and appropriately selected by setting each operation state for each power consumption and appropriately combining a display unit for performing a display operation and a CPU for performing a control operation in each state.

In addition, in the normal mode or the low power mode, the main CPU 111 controls such that the first display unit 12 displays a time, and the sub CPU 211 controls such that the second display unit 22 does not display a time. In the pause mode, the first display unit 12 is turned off, and the sub CPU 211 controls such that the second display unit 22 displays a time.

Thus, the first display unit 12 is turned off when the main CPU 111 is turned off, a display is performed in combination with the sub CPU 211 and the second display unit 22 which can be operated with a low power consumption, and consequently a time display with a minimum power consumption is performed easily and without difficulty.

Further, the main CPU 111 counts a time by using the RAM 112 by control of the main CPU 111 as a first clock unit. The sub microcomputer 21 includes the RTC 212 for counting a time separately from counting a time by control of the main CPU 111 in the main microcomputer 11. The main CPU 111 causes the first display unit 12 to display a time counted by the main CPU 111. The sub CPU 211 causes the second display unit 22 to display a time counted by the RTC 212.

Thus, according to a power consumption mode, a time counting operation and a time display operation in the main microcomputer 11 and a time counting operation and a time display operation in the sub microcomputer 21 are separated. Therefore, in the smart watch 100, time counting and a time display according to consumption power are further easily and appropriately performed by switching operations of two microcomputers.

Further, when a power consumption mode is transited from the normal mode to the low power mode or the pause mode, the main CPU 111 corrects a time of the RTC 212 based on a time counted by the first clock unit. Therefore, even if a time counting operation by the main CPU 111 is stopped, a time difference of the RTC 212 is reduced, and an time display can be easily performed for a while with accuracy as in counting by the main CPU 111.

Further, similarly, when the mode is transited from the normal mode to the low power mode or the pause mode, the main CPU 111 corrects a time of the RTC 312 based on a time counted by the first clock unit. Accordingly, as with the RTC 212, a time counting difference of the RTC 312 is reduced, and a time display with accuracy as in a time counted by the main CPU 111 can be easily performed for a while.

Further, the display screen 22a of the second display unit 22 is stacked on an upper portion of the display screen 12a of the first display unit 12, and the display screen 22a is controlled such that a display content by the first display unit 12 is transmitted in a state in which a time is not displayed. Therefore, any display is performed on a display screen 4, which is a single screen on appearance, by appropriately using a display unit according to a power consumption mode, and consequently a user can appropriately use various displays without the sense of incongruity.

In addition, the first display unit 12 includes a liquid crystal display screen capable of color display. That is, the first display unit 12 can perform various displays by using the color display at least in the normal mode. On the other hand, in the case of an operation with a low power consumption, a power consumption amount can be efficiently reduced by performing driving control to cause the second display unit 22 to perform a display without using the color liquid crystal display screen.

In addition, control of the use of various displays can be easily and appropriately performed by performing the display control of a plurality of display units by a plurality of CPUs in the above-described display control method.

First Variation

Next, a first variation of display control processing will be described.

In the display control processing in the first variation, a main CPU 111, a wireless communication controller 14 (communication unit) and a satellite radio wave receiving module 15 (receiving unit) are included in a time acquisition unit, a counted time is corrected by acquiring, from outside, more highly accurate time information than a time counted by the main CPU 111 and times counted by RTCs 212 and 312.

Figure 6:
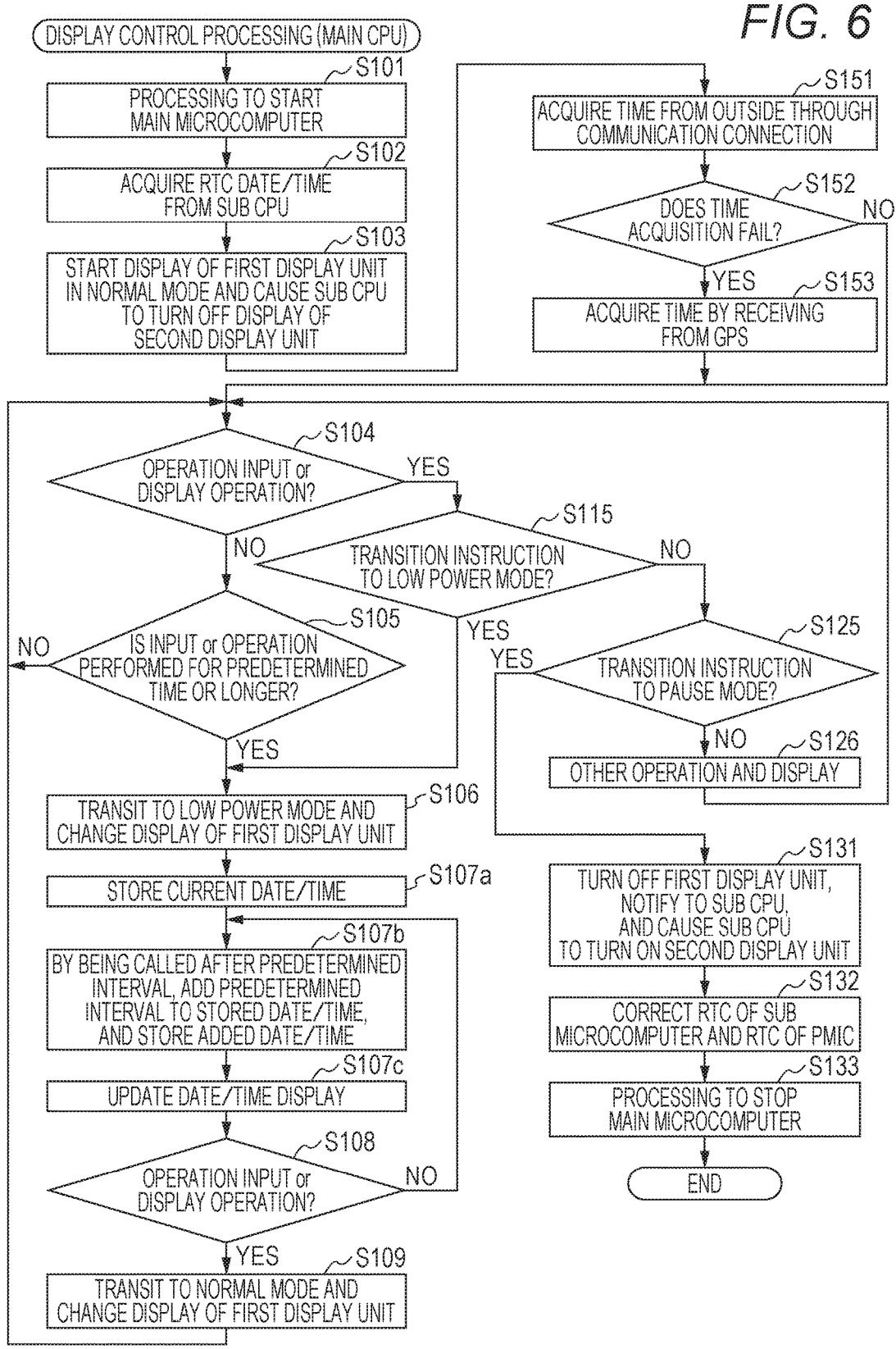
FIG. 6 is a flowchart illustrating a control procedure in display control processing according to a first variation by a main CPU.

FIG. 6 is a flowchart illustrating a control procedure in display control processing in the first variation by the main CPU 111.

This display control processing is same as the display control processing according to the above-described embodiment, other than that processing in steps S151 to S153 is added, and also processing in steps S107a to S107c is performed instead of processing in step S107, and the processing as in the embodiment will be denoted by the same reference sign, and descriptions thereof are omitted.

After processing in step S103 is performed, the main CPU 111 communicates with an external apparatus, such as a smart phone, via the wireless communication controller 14, obtains time information from the external apparatus, and corrects a counting time (step S151). The main CPU 111 determines whether the time information acquisition fails (step S152), and if it is determined that the acquisition fails ("YES" in step S152), the main CPU 111 further acquires time information from a positioning satellite such as a GPS satellite by operating the satellite radio wave receiving module 15 and corrects a counting time (step S153). Then, processing of the main CPU 111 is shifted to step S104. The main CPU 111 may also correct a time of the RTC 312 based on the acquired time information. Further, the main CPU 111 may send the acquired time to a sub CPU 211 and cause the sub CPU 211 to correct times counted by the RTCs 212 and 312.

In the case where it is determined that the acquisition does not fail ("NO" in step S152), processing in the main CPU 111 is shifted to step S104.

Further, when an operation mode transits to a low power mode in processing in step S106, the main CPU 111 causes a storage unit 113 as a storing unit to store counting times (step S107a). As a result, the main CPU 111 stops a time counting operation. The main CPU 111 enters into a waiting state for waiting for an input (calling). When the main CPU 111 is called at predetermined intervals by a counter 311 of a PMIC 31, for example called per minute, the predetermined interval, in other words, one minute, is added to the time stored in the storage unit 113, and the time stored in the storage unit 113 is updated to the added time (step S107b). The main CPU 111 updates a time displayed by the first display unit 12 corresponding to a time stored in the storage unit 113 (step S107c), and then processing is shifted to step S108.

Figure 7:
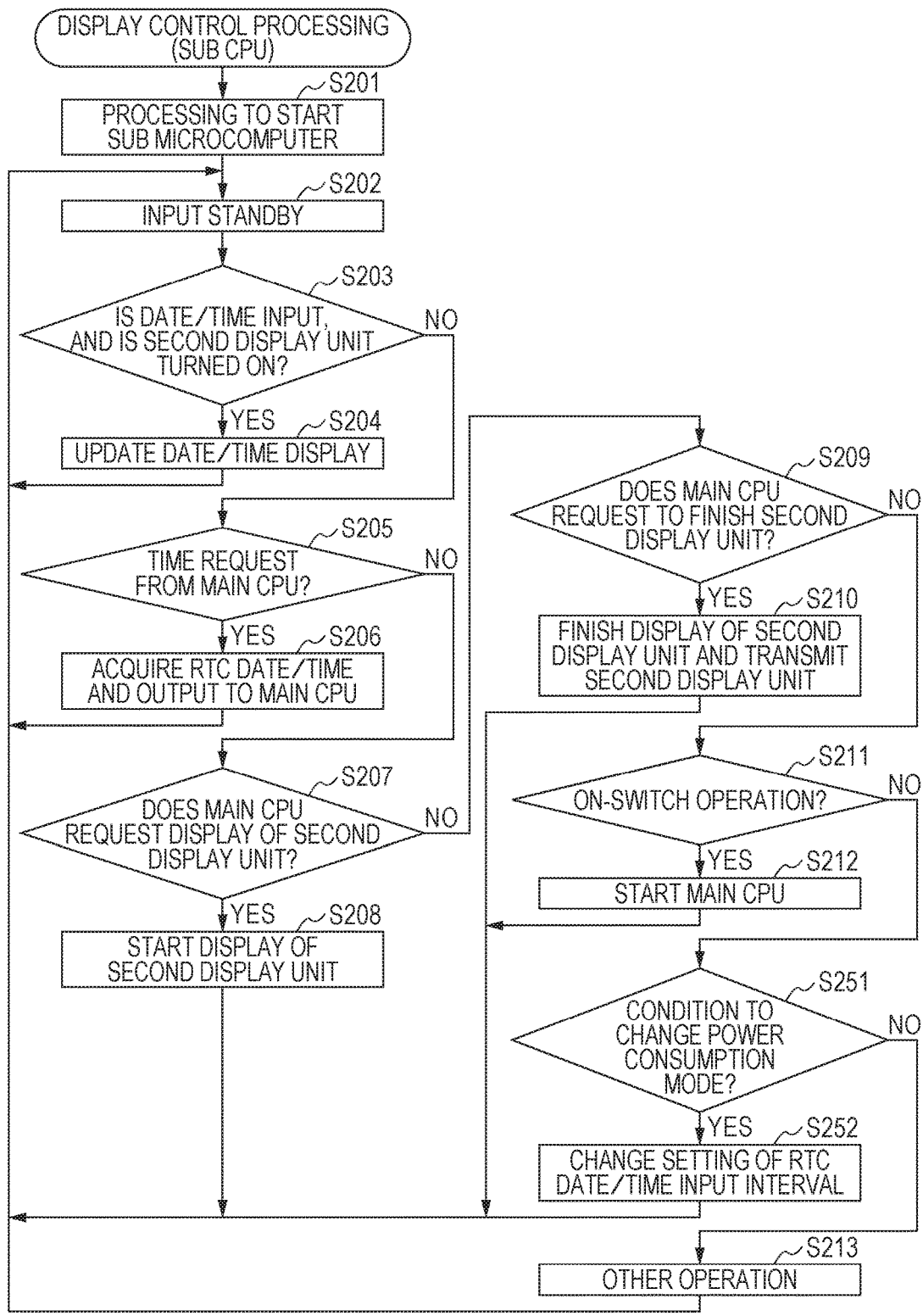
FIG. 7 is a flowchart illustrating a control procedure in the display control processing according to the first variation by a sub CPU.

FIG. 7 is a flowchart illustrating a control procedure in the display control processing according to the first variation by the sub CPU 211.

With respect to the display control processing according to the above-described embodiment, this display control processing is different in the point in which processing in steps S251 and S252 is added. The processing as in the embodiment is denoted by the same reference sign, and a description thereof is omitted.

When "NO" is selected in a determination processing in step S211, the sub CPU 211 determines whether conditions to change a power consumption mode according to an operation state of the sub CPU 211 are satisfied (Step S251). In the case where it is determined that the conditions are not satisfied ("NO" in step S251), processing by the sub CPU 211 is shifted to step S213. In the case where it is determined that the conditions are satisfied ("YES" in step S251), the sub CPU 211 changes a setting of a time interval to input time information to the sub CPU 211 from the RTC 212 (step S252). Then, processing of the sub CPU 211 is returned to step S202.

Figure 3D:
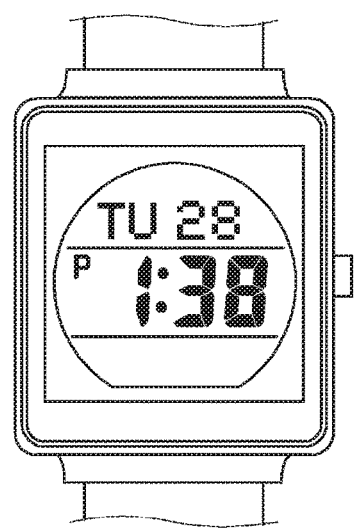
FIG. 3D is an elevation view illustrating an example of a display state in the case where the smart watch is in each power consumption mode.

In the first variation, the sub CPU 211 can be set to two modes including a normal operation mode (second normal mode) and a low power consumption mode (second low power mode). In the normal operation mode, a time to be displayed by a second display unit 22 is updated per second. In the low power consumption mode, the time to be displayed by the second display unit 22 is updated per minute. That is, a time input from the RTC 212 to the sub CPU 211 in step S203 is set per second in the normal operation mode and set per minute in the low power consumption mode (in other words, a time interval in the low power consumption mode is longer than a time interval in the normal operation mode). Further, in response to this, as illustrated in FIG. 3D, in the case of the low power consumption mode, a time to be displayed by the second display unit 22 is indicated in a minute digit, and a second digit is erased.

The operation mode of the sub CPU 211 is set separately from the above-described power consumption mode. For example, the sub CPU 211 can be changed to the low power consumption mode in the normal mode.

As described above, a smart watch 100 which performs display control processing in the first variation includes the counter 311 for counting a predetermined interval, here, a minute interval. In the normal mode, the main CPU 111 causes the first display unit 12 to display a time counted by the main CPU 111 at a first time interval which is shorter than the predetermined time interval while updating per second. In the low power mode, the main CPU 111 is called at predetermined time intervals by the counter 311 and causes the first display unit 12 to display a time.

Therefore, in the low power mode, the main CPU 111 can be intermittently operated, and a power consumption amount can be effectively reduced by lengthening the interval.

In addition, the main microcomputer 11 includes the storage unit 113, and when the operation mode is changed from the normal mode to the low power mode, the main CPU 111 causes the storage unit 113 to store a time counted by the main CPU 111 and stops counting a time by the main CPU 111. In the low power mode, when the main CPU 111 is called by the counter 311, the main CPU 111 reads a time stored in the storage unit 113, calculates a time obtained by adding a predetermined time interval to the read time, and causes the first display unit 12 to display the calculated time.

In this manner, a display on the first display unit 12 is updated by stopping time counting by the main CPU 111 and acquiring necessary time information by appropriately and intermittently being called by a counting operation of the counter 311 separately operated from the main CPU 111. Consequently, an arithmetic processing amount of the main CPU 111 can be significantly reduced.

In addition, the sub CPU 211 can be selectively set to any of a plurality of power consumption modes as an operation state, and a normal operation mode and a low power consumption mode are included. The normal operation mode is a mode for normally operating the sub CPU 211. The low power consumption mode is a mode for operating the sub CPU 211 with a low consumption power in comparison with the normal operation mode. In this manner, a power consumption of the sub CPU 211 can be controlled according to an operation state, and a display can be further efficiently and appropriately controlled.

In addition, a sub microcomputer 21 includes the RTC 212. The RTC 212 includes a counter (second counting unit) for counting a second time interval (one second or one minute). The sub CPU 211 is called at the second time interval by the counter of the RTC 212 and acquires a time counted by the RTC 212. In the low power mode of the sub CPU 211, the second time interval is set to be longer than the interval in the normal operation mode.

In this manner, by lengthening an interval to acquire time information and an interval to update a display, necessary time information can be indicated flexibly at a necessary frequency while adjusting to an appropriate power consumption amount according to an operation state.

In addition, a time acquisition unit is included which acquires, from outside, more accurate time information in comparison with the counting operation by the main CPU 111. The main CPU 111 corrects a time counted by the main CPU 111 based on the time acquired by the time acquisition unit. Consequently, a difference in the time counted by the main CPU 111 is appropriately corrected, and accurate time counting and display can be continued.

In addition, in the case where the operation mode transits from the low power mode or the pause mode to the normal mode, the main CPU 111 causes the time acquisition unit to acquire a time, and the main CPU 111 corrects a counting time based on the acquired time. Therefore, in the smart watch 100, accurate time counting/display can be performed from the beginning of an operation started in the normal mode.

In addition, the wireless communication controller 14 is included which communicates to outside. The main CPU 111 acquires time information by the wireless communication controller 14 from the outside, especially by a portable device such as a smart phone and a cell phone. Therefore, the smart watch 100 can acquire easily and immediately accurate time information from a familiar external device and can count and display an accurate time.

In addition, a satellite radio wave receiving module 15 is included which receives a satellite radio wave including time information from a positioning satellite and acquires time information. The main CPU 111 acquires the time information acquired by the satellite radio wave receiving module 15. Therefore, the smart watch 100 can acquire accurate time information without sending a radio wave or communicating with an external apparatus. In addition, especially, a radio wave from a positioning satellite can be received outdoors all over the world, and without considering an area in which a communication wave can be received and transmitted, accurate time information can be obtained in a wide area.

In addition, the sub CPU 211 can correct a time counted by the RTC 212 based on a time acquired by the time acquisition unit. Consequently, in addition to the case where the main CPU 111 counts a time, a difference in a time counted by the RTC 212 from an accurate time is minimized, and an accuracy of time counting/display in the pause mode may be improved.

Similarly, the sub CPU 211 can correct a time counted by the RTC 312 based on a time acquired by the time acquisition unit. Consequently, a difference in a time counted by the RTC 312 from an accurate time can be minimized.

In addition, the first time interval for updating a time display in the normal mode by the main CPU 111 is one second, and a predetermined time interval for updating a time display in the low power mode is one minute. As described above, in the case where a user does not actively use the smart watch 100, even if a display update interval is lengthened, the user does not have a significant issue, and a difference in a display state can be indicated to the user. Further, a power consumption can be effectively reduced.

Second Variation

Next, a second variation of display control processing will be described.

Figure 8:
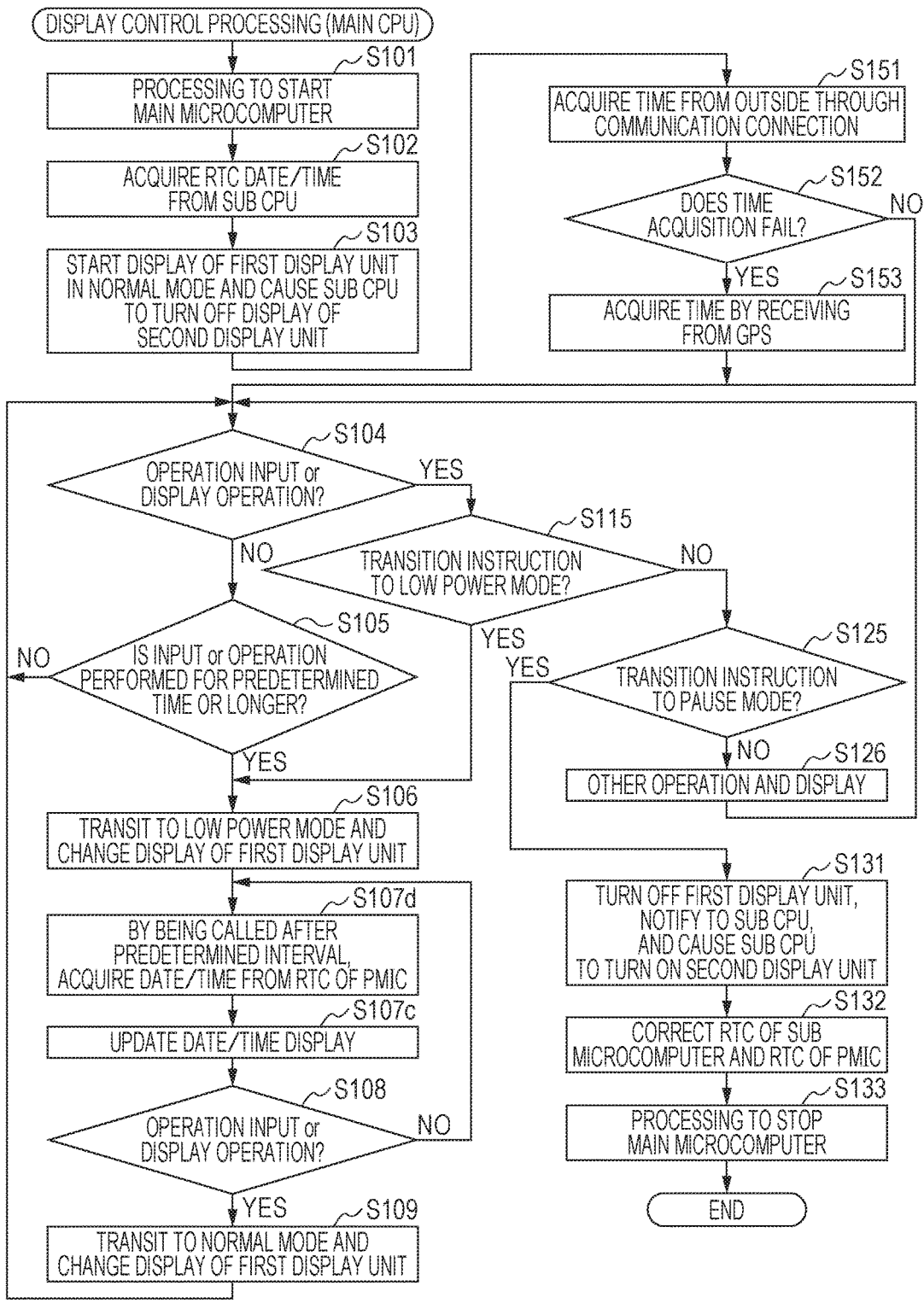
FIG. 8 is a flowchart illustrating a control procedure in display control processing according to a second variation by a main CPU.

FIG. 8 is a flowchart illustrating a control procedure in the display control processing in the second variation by the main CPU 111.

In the display control processing in the second variation, processing in step S107*d* is performed instead of processing in steps S107*a* and S107*b* in the display control processing in the first variation. Other processing contents in the second variation are same as the processing contents in the first variation. The same processing is denoted by a same reference sign, and a description thereof is omitted.

When an operation mode is changed to the low power mode in processing in step S106, a main CPU 111 stops counting a current time and enters into a waiting state to wait for an input (calling). When the main CPU 111 is called by a counter 311 of a PMIC 31 at each predetermined time interval, the main CPU 111 acquires a current time from a RTC 312 of the PMIC 31 (step S107*d*). Then, processing of the main CPU 111 is shifted to step S107*c*.

A calling operation may be performed by direct sending time information from the RTC 312 of the PMIC 31 to the main CPU 111 at each predetermined time interval.

As described above, the smart watch 100 which performs display control processing in the second variation includes the RTC 312 in the PMIC 31, and the RTC 312 counts a time separately from an RTC 212 and a time counted by the main CPU 111. In the low power mode, the main CPU 111 stops time counting by the main CPU 111, and when being called by the counter 311, acquires a time from the RTC 312 and causes a first display unit 12 to display the time. As a result, a power consumption can be reduced by significantly reducing a processing operation of the main CPU 111. In addition, since a time display on the first display unit 12 is updated by intermittently acquiring time information at a necessary timing from the RTC 312 operating separately from an operation of a main microcomputer 11 and a sub microcomputer 21, the main microcomputer 11 and the sub microcomputer 21 are not operated more than necessary.

In addition, the RTC 312 is a real time clock. Therefore, a smart watch 100 can efficiently count a time with a low power consumption regardless of an operation of the main microcomputer 11 and the sub microcomputer 21 by using a known IC chip, or the like.

Third Variation

Next, a third variation of display control processing will be described.

In display control processing in the third variation, in a low power mode, a sub CPU 211, not the main CPU 111, controls a display by a first display unit 12. A display content to the first display unit 12 in the low power mode is not changed from the above-described embodiment and the first and second variations. However, a display time is updated based on a time counted by an RTC 212.

Figure 9:
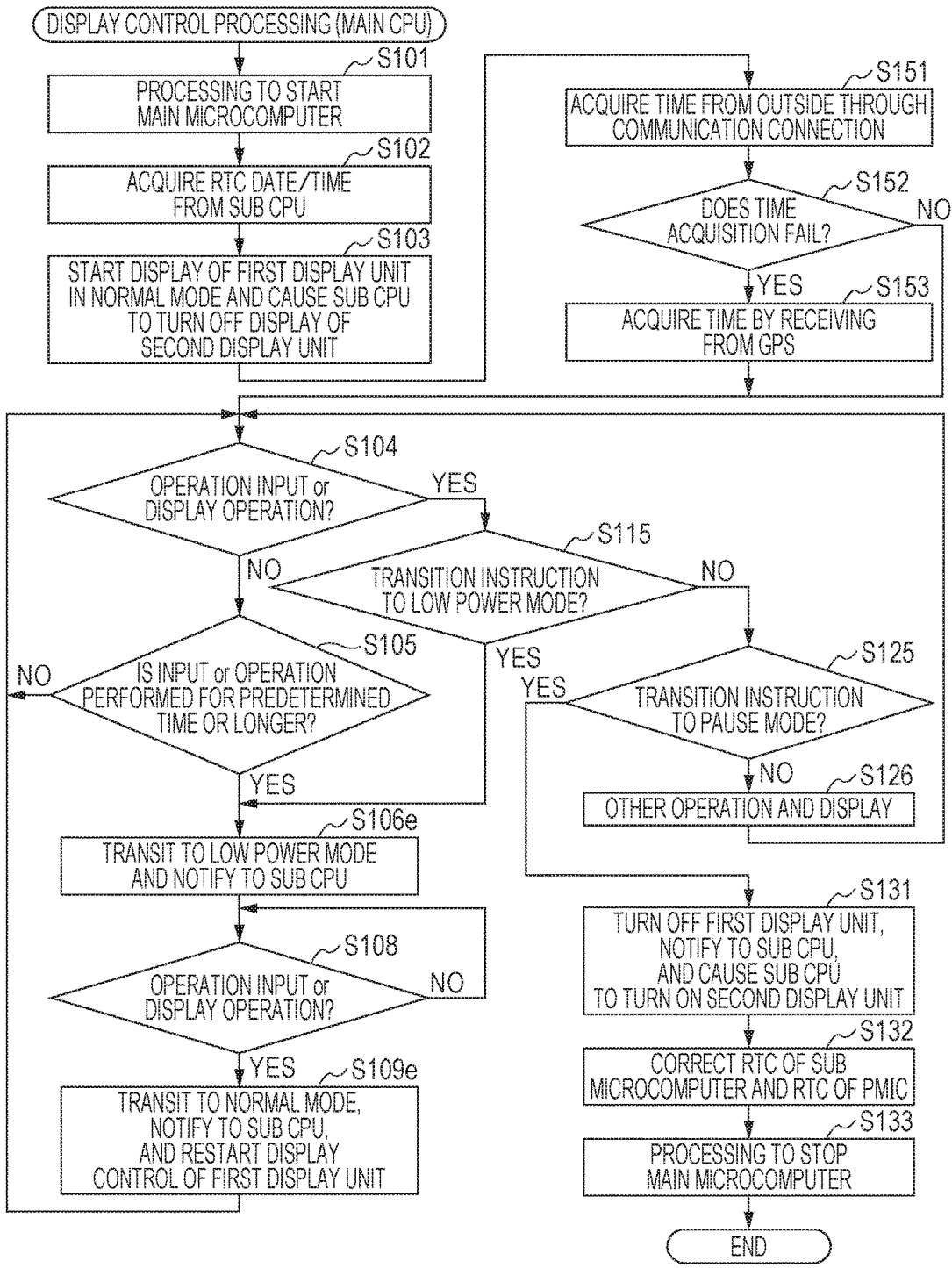
FIG. 9 is a flowchart illustrating a control procedure in display control processing according to a third variation by a main CPU.

FIG. 9 is a flowchart illustrating a control procedure in the display control processing in the third variation by the main CPU 111.

In the display control processing in the third variation, processing in steps S107*a* to S107*c* in the display control processing in the first variation is omitted, and also, instead of processing in steps S106 and S109, each of steps S106*e* and S109*e* is performed. Other processing contents are same as the display control processing in the second and third variations. The same processing is denoted by a same reference sign, and a description thereof is omitted.

When "YES" is selected in determination processing in step S105, the main CPU 111 performs each operation to transit to a low power mode. At this time, the main CPU 111 stops display control of the first display unit 12, also stops time counting, and notifies the sub CPU 211 that an operation mode is transited to the low power mode (step S106*e*). Then, processing in the main CPU 111 is shifted to step S108, and the main CPU 111 repeats the processing in step S108 or simply waits until an operation input is detected or an input to update a display content related to an operation of a predetermined functional operation unit controlled by the main CPU 111 is detected.

When "YES" is selected in processing in step S108, the main CPU 111 performs each operation to transit to a normal power mode. In addition, at this time, the main CPU 111 sends, to the sub CPU 211, a notice that an operation mode is returned to the normal mode and restarts time counting by acquiring a time of the RTC 212. The main CPU 111 restarts display control operation of the first display unit 12 (step S109*e*). Then, processing of the main CPU 111 is returned to step S104.

Figure 10:
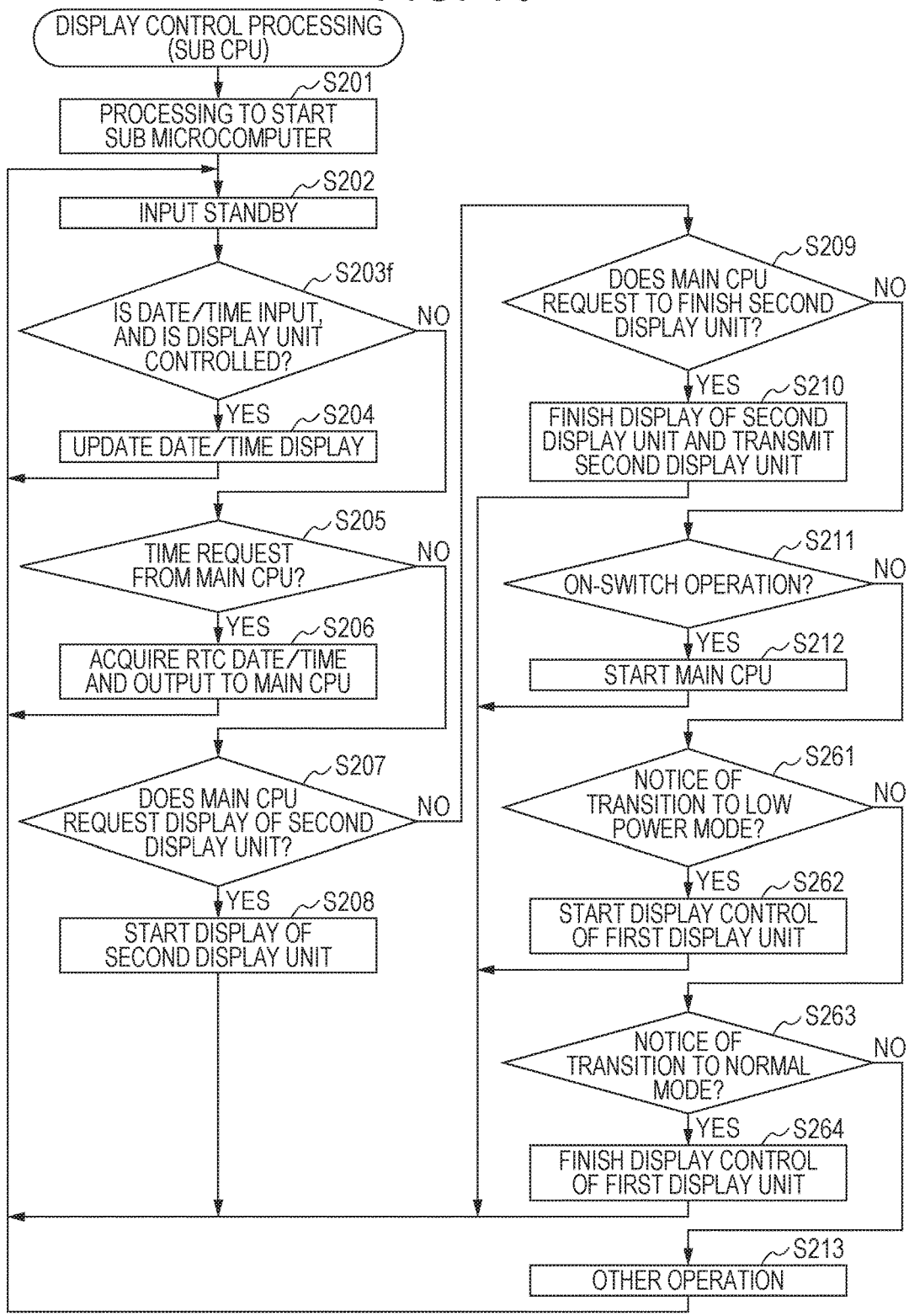
FIG. 10 is a flowchart illustrating a control procedure in the display control processing according to the third variation by a sub CPU.

FIG. 10 is a flowchart illustrating a control procedure in the display control processing according to the third variation by the sub CPU 211.

In the display control processing, processing in steps S261 to S264 is added instead of steps S251 and S252 in comparison with the display control processing in the first variation. Further, other than that processing in step S203*f* is performed instead of processing in step S203, and the display control processing is same as the display control processing in the first variation. The same processing contents are denoted by same reference signs, and descriptions thereof are omitted.

When an input is detected in processing in step S202, and the processing is shifted to step S203*f*, the sub CPU 211 determines whether an input content is time information, and the sub CPU 211 can control either of the first display unit 12 or the second display unit 22 (step S203*f*). When it is determined that the time information is input, and the first display unit 12 is controlled (specifically, in a low power mode) or the second display unit 22 is controlled (specifically, in a pause mode) ("YES" in step S203*f*), the sub CPU 211 updates a time display in the display unit under control (step S204). Then, processing of the sub CPU 211 is returned to step S202. When it is determined that time information is not acquired, or the sub CPU 211 is not controlling the first display unit 12 and the second display unit 22 ("NO" in step S2031), processing by the sub CPU 211 is shifted to step S205.

In addition, in the case where "NO" is selected in the determination processing in step S211, the sub CPU 211 determines whether a notice of transition to a low power mode is obtained from the main CPU 111 (step S261). In the case where it is determined that the notice to transition to the low power mode is acquired ("YES" in step S261), the sub CPU 211 starts display control of the first display unit 12 (step S262). Then, processing of the sub CPU 211 is returned to step S202.

In the case where it is determined that a notice to transition to a lower power mode is not acquired ("NO" in step S261), and the sub CPU 211 determines whether a notice to transition to a normal mode is acquired from the main CPU 111 (step S263). In the case where it is determined that the notice to transition to the normal mode is acquired ("YES" in step S263), the sub CPU 211 finishes display control of the first display unit 12 (step S264). Then, processing of the sub CPU 211 is returned to step S202.

In the case where it is determined that the notice to transition to the normal mode is not acquired ("NO" in step S263), processing by the sub CPU 211 is shifted to step S213.

As described above, in the display control processing in the third variation, in the normal mode, the main CPU 111 controls such that the first display unit 12 displays a time, and the sub CPU 211 controls such that the second display unit 22 does not display a time. In the low power mode, the sub CPU 211 controls such that the first display unit 12 displays a time, and the second display unit 22 does not display a time. In the pause mode, the first display unit 12 is turned off, and the sub CPU 211 controls such that the second display unit 22 displays a time.

In this manner, with respect to the normal mode in which the main CPU 111 and the first display unit 12 are used, the sub CPU 211 is used to reduce a power consumption in the low power mode, and the power consumption is further reduced by using the second display unit 22 in the pause mode. The smart watch 100 can be obtained in which various displays are efficiently and appropriately used by easily and simply switching control patterns according to a power consumption.

In addition, the main CPU 111 causes the first display unit 12 to display a time counted by the main CPU 111 in the normal mode, the sub CPU 211 causes the first display unit 12 to display a time counted by the RTC 212 in the low power mode, and the sub CPU 211 causes the second display unit 22 to display a time counted by the RTC 212 in the pause mode.

In this manner, by gradually reducing process loads related to time counting and time display, the smart watch 100 can appropriately display a time corresponding to a power consumption by efficiently and appropriately switching the power consumption.

The present invention is not limited to the above-described embodiment and can be variously changed.

For example, the above embodiment indicates the case where the display screen 22*a* of the second display unit 22 is stacked on the display screen 12*a* of the first display unit 12. However, the stack order may be opposite, or the two display screens may be arranged in parallel. In addition, the display screen is not limited to a liquid crystal display screen, and an electro-luminescent (EL) display may be used.

Further, the above embodiment indicates that the first display unit 12 and the second display unit 22 are arranged one by one. However, a plurality of the first display units 12 (display screens 12*a*) and a plurality of the second display units 22 (display screens 22*a*) may be provided.

As a receiving unit, regarding the satellite radio wave receiving module 15, it has been described that time information can be acquired by receiving radio waves from a GPS satellite. However, the time information may be acquired by receiving radio waves from other positioning satellites such as GLONASS. Further, in addition to receiving radio waves, the time information may be obtained by receiving a standard radio waves with long wavelength.

Furthermore, the time information acquired by using the satellite radio wave receiving module 15, may be performed in advance of time information acquisition via the wireless communication controller 14. Alternatively, accurate time information may be obtained by using only the satellite radio wave receiving module 15.

In the above embodiment, the satellite radio wave receiving module 15 is connected to the main microcomputer 11 and acquires time information by control of the main microcomputer 11. However, the satellite radio wave receiving module 15 may be connected to the sub microcomputer 21, and time information may be acquired by control of the sub microcomputer 21.

Further, in the above embodiment, a date and a time of the RTC 212 is obtained from the sub CPU 211 after the main microcomputer 11 is started up, and then the main CPU 111 obtains highly accurate time information from a smart phone and a GPS satellite and corrects times counted by the RTCs 212 and 312. However, highly accurate time information may be obtained first from a smart phone and a GPS satellite immediately after the main microcomputer 11 is started up, and then times counted by the RTCs 212 and 312 may be corrected.

In addition, it has been described in the above embodiment that the sub microcomputer 21 and the PMIC 31 each include RTCs 212 and 312. However, a common RTC may be used. In addition, in the sub microcomputer 21, the sub CPU 211 may count a time without using an RTC.

In addition, in the above embodiment, the RTC 312 is included in the PMIC 31. However, the main microcomputer 11 may include the RTC 312.

In addition, the sub CPU 211 corrects a time of the RTCs 212 and 312, but it is not limited to the sub CPU 211. The main CPU 111 may correct the time. In addition, after the main CPU 111 corrects a time counted by the main CPU 111, times of the RTCs 212 and 312 may be corrected based on the corrected time. In addition, such that the sub CPU 211 and the main CPU 111 can independently acquire time information from outside, the wireless communication controller 14 and the satellite radio wave receiving module 15 may be connected to the sub microcomputer 21 and operate by control of the sub CPU 211.

Selection of a display unit and display control indicated in the above-described embodiment and each variation may be determined by combination corresponding to each power consumption mode as long as both of them do not conflict to each other. In addition to the above-described three power consumption modes, an intermediate mode among the three modes may be included.

In addition, a transition operation of the above-described power consumption modes and a display control in response to the transition are performed in cooperation with the main CPU 111 and the sub CPU 211 as a processor. However, these control operations may be partially performed by using a special logical circuit.

In addition, the main CPU 111 may understand a current power consumption mode of the smart watch 100 in the above power consumption modes, and also both of the main CPU 111 and the sub CPU 211 may understand the mode.

In the above embodiment, a smart watch is exemplified as an electronic device in the description. However, the electronic device is not necessarily a smart watch. The present invention can be preferably applied to other display terminals, especially, a portable and wearable type terminals.

In addition, the configuration indicated in the above-described embodiment, specific details in a control procedure and a display example can be appropriately changed within a scope of the present invention.

Embodiments according to the present invention have been described above. However, a scope of the present invention is not limited to the above-described embodiment, and the scope of the present invention described in Claims and a scope equivalent thereto are included.

The invention claimed is:

1. An electronic device, comprising:
   a first processor;
   a second processor;
   a first display unit; and
   a second display unit,
   wherein:
   the first processor and the second processor cooperate with each other and perform a display operation including a time display,
   the first processor is selectively set to any of a normal mode, a low power mode in which a power consumption is lower than a power consumption in the normal mode, and a pause mode in which a power consumption is lower than the power consumption in the low power mode and the first processor is stopped,
   in the normal mode, the first processor performs control such that the first display unit displays a time, and the second processor performs control such that the second display unit does not display a time,
   in the low power mode, the second processor performs control such that the first display unit displays a time and the second display unit does not display a time, and
   in the pause mode, the first display unit is turned off, and the second processor performs control such that the second display unit displays a time.

2. The electronic device according to claim 1, further comprising:
   a first clock unit configured to count a time by control of the first processor; and a second clock unit configured to count a time separately from the first clock unit, wherein:
in the normal mode, the first processor performs control such that the first display unit displays a time counted by the first clock unit,
in the low power mode, the second processor performs control such that the first display unit displays a time counted by the second clock unit, and
in the pause mode, the second processor performs control such that the second display unit displays a time counted by the second clock unit.

3. An electronic comprising:
a first processor;
a second processor;
a first display unit;
a second display unit;
a first clock unit configured to count a time by control of the first processor;
a second clock unit configured to count a time separately from the first clock unit; and
a first counting unit configured to count a predetermined time interval, wherein:
the first processor and the second processor cooperate with each other and perform a display operation including a time display,
the first processor is selectively set to any of a normal mode, a low power mode in which a power consumption is lower than a power consumption in the normal mode, and a pause mode in which a power consumption is lower than the power consumption in the low power mode and the first processor is stopped,
in the normal mode, the first processor performs control such that the first display unit displays a time counted by the first clock unit at a first time interval which is shorter than the predetermined time interval while updating the time, and the second processor performs control such that the second display unit does not display a time,
in the low power mode, the first processor performs control such that the first display unit displays a time by being called by the first counting unit at the predetermined time intervals, and the second processor performs control such that the second display unit does not display a time, and
in the pause mode, the first display unit is turned off, and the second processor performs control such that the second display unit displays a time counted by the second clock unit.

4. The electronic device according to claim 3, wherein the second processor operates with low power consumption and/or at a low operation frequency in comparison with the first processor.

5. The electronic device according to claim 4, wherein the second processor is e selectively set to any of a second normal mode in which the second processor normally operates, and a second low power mode in which the second processor operates with a low power consumption in comparison with the second normal mode.

6. The electronic device according to claim 3, further comprising a storage unit,
wherein:
the first processor performs control such that the storage unit stores a time counted by the first clock unit and to stop time counting by the first clock unit, in a case in which a power consumption mode is changed from the normal mode to the low power mode, and
when called by the first counting unit in the low power mode, the first processor reads out the time stored in the storage unit, calculates a time in which the predetermined time interval is added to the read out time, and performs control such that the first display unit displays the calculated time.

7. The electronic device according to claim 3, further comprising a third clock unit configured to count a time separately from the first and second clock units,
wherein, in the low power mode, the first processor stops performs control to stop time counting by the first clock unit, and when called by the first counting unit, the first processor acquires a time from the third clock unit and performs control such that the first display unit displays the time.

8. The electronic device according to claim 7, wherein when the power consumption mode is changed from the normal mode to the low power mode or the pause mode, the first processor corrects a time of the third clock unit based on a time counted by the first clock unit.

9. The electronic device according to claim 3, wherein:
the second processor is selectively set to any of a second normal mode in which the second processor normally operates, and a second low power mode in which the second processor operates with low power consumption in comparison with the second normal mode,
the second processor comprises a second counting unit configured to count a second time interval,
the second clock unit is a real time clock, and
the second processor obtains a time of the second clock unit by being called at the second time intervals by the second counting unit, and in the second low power mode, the second time interval is set longer than a time counting interval in the second normal mode.

10. The electronic device according to claim 3, further comprising a time acquisition unit configured to acquire time information from outside,
wherein the first processor corrects a time counted by the first clock unit based on a time acquired by the time acquisition unit.

11. The electronic device according to claim 10, wherein when a power consumption mode is changed from the low power mode or the pause mode to the normal mode, the first processor performs control such that the time acquisition unit acquires a time and the first processor corrects a time counted by the first clock unit based on the acquired time.

12. The electronic device according to claim 3, wherein when the power consumption mode is changed from the normal mode to the low power mode or the pause mode, the first processor corrects a time of the second clock unit based on a time counted by the first clock unit.

13. The electronic device according to claim 3, wherein:
the second display unit is stacked on an upper portion of the first display unit, and
in the low power mode and the pause mode, in which the second display unit does not display a time, the second display unit is controlled so as to transmit a display content of the first display unit.

14. A display control method for an electronic device, the electronic device including a first processor, a second processor, a first display unit, a second display unit, a first clock unit configured to count a time by control of the first processor, a second clock unit configured to count a time separately from the first clock unit, and a first counting unit configured to count a predetermined time interval, the method comprising:
- performing a display operation including a time display under control by the first processor and the second processor; and
- selectively setting the first processor to any of a normal mode, a low power mode in which a power consumption is lower than a power consumption in the normal mode, and a pause mode in which a power consumption is lower than the power consumption in the low power mode and the first processor is stopped, wherein:
- in the normal mode, the first processor performs control such that the first display unit displays a time counted by the first clock unit at a first time interval which is shorter than the predetermined time interval while updating the time, and the second processor performs control such that the second display unit does not display a time,
- in the low power mode, the first processor performs control such that the first display unit displays a time by being called by the first counting unit at the predetermined time intervals, and the second processor performs control such that the second display unit does not display a time, and
- in the pause mode, the first display unit is turned off, and the second processor performs control such that the second display unit displays a time counted by the second clock unit.

* * * * *

UNITED STATES PATENT AND TRADEMARK OFFICE
CERTIFICATE OF CORRECTION

PATENT NO. : 10,274,904 B2
APPLICATION NO. : 15/373423
DATED : April 30, 2019
INVENTOR(S) : Tsuyoshi Minami et al.

It is certified that error appears in the above-identified patent and that said Letters Patent is hereby corrected as shown below:

In the Claims

Column 17, Line 57, Claim 5, Line 2, after "is" delete "e".

Column 18, Line 12, Claim 7, Line 4, after "processor" delete "stops".

Signed and Sealed this
Tenth Day of September, 2019

Andrei Iancu
*Director of the United States Patent and Trademark Office*